(12) United States Patent
Schuch et al.

(10) Patent No.: US 9,812,047 B2
(45) Date of Patent: Nov. 7, 2017

(54) SYSTEM AND METHOD FOR REMOTELY MONITORING THE OPERATING LIFE OF ELECTRONIC DISPLAYS

(75) Inventors: John Schuch, Buford, GA (US); Rick De Laet, Alpharetta, GA (US)

(73) Assignee: MANUFACTURING RESOURCES INTERNATIONAL, INC., Alpharetta, GA (US)

( * ) Notice: Subject to any disclaimer, the term of this patent is extended or adjusted under 35 U.S.C. 154(b) by 844 days.

(21) Appl. No.: 12/986,787

(22) Filed: Jan. 7, 2011

(65) Prior Publication Data

US 2011/0283199 A1     Nov. 17, 2011

Related U.S. Application Data

(60) Provisional application No. 61/308,139, filed on Feb. 25, 2010, provisional application No. 61/312,892, filed on Mar. 11, 2010.

(51) Int. Cl.
*G09G 3/00* (2006.01)
*G09G 5/00* (2006.01)
(Continued)

(52) U.S. Cl.
CPC .............. *G09G 3/006* (2013.01); *G09G 5/00* (2013.01); *H04L 41/22* (2013.01); *H04N 7/173* (2013.01);
(Continued)

(58) Field of Classification Search
CPC ............... G09G 3/006; G09G 2320/02; G09G 2320/029; G09G 2320/0295;
(Continued)

(56) References Cited

U.S. PATENT DOCUMENTS 5,162,785 A    11/1992  Fagard
5,351,201 A    9/1994   Harshbarger, Jr. et al.
(Continued)

FOREIGN PATENT DOCUMENTS

EP    0313331 B1    2/1994
EP    1821538 A1    8/2007
(Continued)

OTHER PUBLICATIONS

Photo Research, PR-650 SpectraScan Colorimeter, 1999, 2 Pages.
(Continued)

*Primary Examiner* — Gene W Lee
(74) *Attorney, Agent, or Firm* — Standley Law Group LLP

(57) ABSTRACT

A system for remotely monitoring and controlling one or more electronic displays containing several hardware components. The components may electronically communicate with a network connection which can be used to establish communication with a local area network and/or the internet. A personal computing device can be used to run a user interface which allows the user to access a wealth of information from the electronic display as well as change controlling software, operating parameters, and check for downtime incidents or failures. Various sensors and measurement devices can be installed within the display to provide the information which may be stored locally or stored remotely for real-time access or on-demand access.

17 Claims, 14 Drawing Sheets

(51) Int. Cl.
    *H04N 17/00* (2006.01)
    *H04L 12/24* (2006.01)
    *H04N 7/173* (2011.01)
    *H04N 21/414* (2011.01)
    *H04N 21/442* (2011.01)
    *H04N 21/4425* (2011.01)
    *H04N 21/658* (2011.01)
    *H04N 21/81* (2011.01)
    *H04L 29/08* (2006.01)

(52) U.S. Cl.
    CPC ........... *H04N 17/00* (2013.01); *H04N 17/004* (2013.01); *H04N 21/41415* (2013.01); *H04N 21/4424* (2013.01); *H04N 21/4425* (2013.01); *H04N 21/6582* (2013.01); *H04N 21/812* (2013.01); *H04L 67/12* (2013.01)

(58) Field of Classification Search
    CPC ......... G09G 2320/041; G09G 2330/04; G09G 2330/045; G09G 2360/14–2360/148; G09G 2380/06; G02F 1/1309
    USPC .................. 345/87–104, 204–215, 690–699
    See application file for complete search history.

(56) References Cited

U.S. PATENT DOCUMENTS

| | | |
|---|---|---|
| 5,590,831 A | 1/1997 | Manson et al. |
| 5,751,346 A | 5/1998 | Dozier et al. |
| 5,786,801 A | 7/1998 | Ichise |
| 5,952,992 A | 9/1999 | Helms |
| 6,144,359 A | 11/2000 | Grave |
| 6,157,143 A | 12/2000 | Bigio et al. |
| 6,215,411 B1 | 4/2001 | Gothard |
| 6,222,841 B1 | 4/2001 | Taniguchi |
| 6,259,492 B1 | 7/2001 | Imoto et al. |
| 6,384,736 B1 | 5/2002 | Gothard |
| 6,421,694 B1 | 7/2002 | Nawaz et al. |
| 6,509,911 B1* | 1/2003 | Shimotono ........... G06F 1/3215 345/1.1 |
| 6,546,294 B1 | 4/2003 | Kelsey et al. |
| 6,553,336 B1* | 4/2003 | Johnson ................. G01D 3/022 702/108 |
| 6,587,525 B2 | 7/2003 | Jeong et al. |
| 6,753,842 B1 | 6/2004 | Williams et al. |
| 6,812,851 B1 | 11/2004 | Dukach et al. |
| 6,850,209 B2 | 2/2005 | Mankins et al. |
| 6,968,375 B1 | 11/2005 | Brown |
| 7,038,186 B2 | 5/2006 | De Brabander |
| 7,064,672 B2 | 6/2006 | Gothard |
| 7,319,862 B1 | 1/2008 | Lincoln et al. |
| 7,330,002 B2 | 2/2008 | Joung |
| 7,369,058 B2 | 5/2008 | Gothard |
| 7,380,265 B2 | 5/2008 | Jensen et al. |
| 7,391,317 B2 | 6/2008 | Abraham et al. |
| 7,451,332 B2 | 11/2008 | Culbert et al. |
| 7,474,294 B2 | 1/2009 | Leo et al. |
| 7,577,458 B2 | 8/2009 | Lin |
| 7,581,094 B1 | 8/2009 | Apostolopoulos et al. |
| 7,595,785 B2 | 9/2009 | Jang |
| 7,612,278 B2 | 11/2009 | Sitrick |
| 7,614,065 B2 | 11/2009 | Weissmueller, Jr. et al. |
| 7,636,927 B2 | 12/2009 | Zigmond et al. |
| 7,675,862 B2 | 3/2010 | Pham |
| 7,751,813 B2 | 7/2010 | Varanda |
| 7,764,280 B2* | 7/2010 | Shiina ....................... G06F 3/14 345/204 |
| 7,774,633 B1 | 8/2010 | Harrenstien et al. |
| 7,795,821 B2 | 9/2010 | Jun |
| 8,212,921 B2* | 7/2012 | Yun ............................... 348/460 |
| 8,218,812 B2 | 7/2012 | Sugimoto et al. |
| 8,248,203 B2* | 8/2012 | Hanwright .............. G06F 3/147 340/3.44 |
| 8,441,574 B2 | 5/2013 | Dunn et al. |
| 8,689,343 B2 | 4/2014 | De Laet |
| 8,983,385 B2 | 3/2015 | Macholz |
| 9,026,686 B2 | 5/2015 | Dunn et al. |
| 2002/0019933 A1 | 2/2002 | Friedman et al. |
| 2002/0026354 A1 | 2/2002 | Shoji et al. |
| 2002/0112026 A1 | 8/2002 | Fridman et al. |
| 2002/0120721 A1 | 8/2002 | Eilers et al. |
| 2002/0147648 A1 | 10/2002 | Fadden et al. |
| 2002/0163513 A1 | 11/2002 | Tsuji |
| 2002/0163916 A1 | 11/2002 | Oskouy et al. |
| 2002/0164962 A1 | 11/2002 | Mankins et al. |
| 2002/0190972 A1* | 12/2002 | Ven de Van ............. G09F 9/30 345/204 |
| 2002/0194365 A1 | 12/2002 | Jammes |
| 2002/0194609 A1 | 12/2002 | Tran |
| 2003/0031128 A1 | 2/2003 | Kim et al. |
| 2003/0039312 A1 | 2/2003 | Horowitz et al. |
| 2003/0061316 A1 | 3/2003 | Blair et al. |
| 2003/0097497 A1 | 5/2003 | Esakov |
| 2003/0098881 A1* | 5/2003 | Nolte et al. .................... 345/764 |
| 2003/0161354 A1 | 8/2003 | Bader et al. |
| 2003/0177269 A1 | 9/2003 | Robinson et al. |
| 2003/0196208 A1 | 10/2003 | Jacobson |
| 2003/0214242 A1* | 11/2003 | Berg-johansen ........... 315/169.3 |
| 2003/0230991 A1 | 12/2003 | Muthu et al. |
| 2004/0036697 A1 | 2/2004 | Kim et al. |
| 2004/0138840 A1 | 7/2004 | Wolfe |
| 2004/0158872 A1 | 8/2004 | Kobayashi |
| 2004/0194131 A1 | 9/2004 | Ellis et al. |
| 2004/0243940 A1* | 12/2004 | Lee et al. ....................... 715/744 |
| 2004/0252400 A1 | 12/2004 | Blank et al. |
| 2004/0253947 A1 | 12/2004 | Phillips et al. |
| 2005/0033840 A1 | 2/2005 | Nisani et al. |
| 2005/0070335 A1 | 3/2005 | Jitsuishi et al. |
| 2005/0071252 A1 | 3/2005 | Henning et al. |
| 2005/0073518 A1 | 4/2005 | Bontemp |
| 2005/0088984 A1 | 4/2005 | Chin et al. |
| 2005/0123001 A1 | 6/2005 | Craven et al. |
| 2005/0132036 A1 | 6/2005 | Jang et al. |
| 2005/0179554 A1* | 8/2005 | Lu ........................ G08B 21/185 340/641 |
| 2005/0184983 A1* | 8/2005 | Brabander et al. ........... 345/204 |
| 2005/0216939 A1 | 9/2005 | Corbin |
| 2005/0231457 A1 | 10/2005 | Yamamoto et al. |
| 2005/0267943 A1 | 12/2005 | Castaldi et al. |
| 2005/0289061 A1 | 12/2005 | Kulakowski et al. |
| 2005/0289588 A1 | 12/2005 | Kinnear |
| 2006/0007107 A1 | 1/2006 | Ferguson |
| 2006/0022616 A1 | 2/2006 | Furukawa et al. |
| 2006/0150222 A1 | 7/2006 | McCafferty et al. |
| 2006/0160614 A1 | 7/2006 | Walker et al. |
| 2006/0269216 A1 | 11/2006 | Wiemeyer et al. |
| 2007/0039028 A1 | 2/2007 | Bar |
| 2007/0157260 A1 | 7/2007 | Walker |
| 2007/0168539 A1 | 7/2007 | Day |
| 2007/0200513 A1 | 8/2007 | Ha et al. |
| 2007/0214812 A1 | 9/2007 | Wagner et al. |
| 2007/0237636 A1* | 10/2007 | Hsu ................................. 416/5 |
| 2007/0268241 A1 | 11/2007 | Nitta et al. |
| 2007/0273519 A1 | 11/2007 | Ichikawa et al. |
| 2007/0274400 A1 | 11/2007 | Murai et al. |
| 2007/0286107 A1 | 12/2007 | Singh et al. |
| 2007/0291198 A1 | 12/2007 | Shen |
| 2008/0008471 A1 | 1/2008 | Dress |
| 2008/0024268 A1 | 1/2008 | Wong et al. |
| 2008/0034205 A1 | 2/2008 | Alain et al. |
| 2008/0037466 A1 | 2/2008 | Ngo et al. |
| 2008/0037783 A1 | 2/2008 | Kim et al. |
| 2008/0055297 A1 | 3/2008 | Park |
| 2008/0096559 A1 | 4/2008 | Phillips et al. |
| 2008/0104631 A1 | 5/2008 | Krock et al. |
| 2008/0111958 A1 | 5/2008 | Kleverman et al. |
| 2008/0112601 A1 | 5/2008 | Warp |
| 2008/0136770 A1 | 6/2008 | Peker et al. |
| 2008/0163291 A1 | 7/2008 | Fishman et al. |
| 2008/0185976 A1 | 8/2008 | Dickey et al. |
| 2008/0218501 A1 | 9/2008 | Diamond |
| 2008/0246871 A1 | 10/2008 | Kupper |
| 2008/0266554 A1* | 10/2008 | Sekine et al. ................. 356/300 |

(56) References Cited

U.S. PATENT DOCUMENTS

| | | | |
|---|---|---|---|
| 2008/0267328 A1* | 10/2008 | Ianni et al. | 375/354 |
| 2008/0278099 A1 | 11/2008 | Bergfors et al. | |
| 2008/0281165 A1* | 11/2008 | Rai et al. | 600/300 |
| 2008/0303918 A1 | 12/2008 | Keithley | |
| 2008/0313691 A1 | 12/2008 | Cholas et al. | |
| 2009/0009997 A1* | 1/2009 | Sanfilippo et al. | 362/244 |
| 2009/0015400 A1 | 1/2009 | Breed | |
| 2009/0036190 A1 | 2/2009 | Brosnan et al. | |
| 2009/0079416 A1* | 3/2009 | Vinden et al. | 324/103 R |
| 2009/0104989 A1 | 4/2009 | Williams et al. | |
| 2009/0152445 A1 | 6/2009 | Gardner, Jr. | |
| 2009/0164615 A1 | 6/2009 | Akkanen | |
| 2009/0273568 A1 | 11/2009 | Milner | |
| 2009/0315867 A1* | 12/2009 | Sakamoto et al. | 345/184 |
| 2010/0017526 A1 | 1/2010 | Jagannath et al. | |
| 2010/0037274 A1 | 2/2010 | Meuninck et al. | |
| 2010/0060550 A1* | 3/2010 | McGinn | G06F 1/3231 345/2.1 |
| 2010/0177750 A1* | 7/2010 | Essinger | H04L 67/12 370/338 |
| 2010/0231563 A1 | 9/2010 | Dunn et al. | |
| 2010/0237697 A1* | 9/2010 | Dunn et al. | 307/31 |
| 2010/0238299 A1 | 9/2010 | Dunn et al. | |
| 2012/0302343 A1 | 11/2012 | Hurst et al. | |

FOREIGN PATENT DOCUMENTS

| | | | |
|---|---|---|---|
| EP | 2351369 | A2 | 8/2011 |
| EP | 2396964 | A2 | 12/2011 |
| JP | 2000-122575 | A | 4/2000 |
| JP | 2002064842 | | 2/2002 |
| JP | 2002209230 | | 7/2002 |
| JP | 2005236469 | | 9/2005 |
| JP | 2005333568 | A | 12/2005 |
| WO | 9608892 | A1 | 3/1996 |
| WO | 2008-050402 | A1 | 5/2008 |
| WO | 2011106683 | | 9/2011 |

OTHER PUBLICATIONS

Texas Advanced Optoelectronic Solutions, TCS230 Programmable Color Light-To-Frequency Converter, 2007, 12 Pages.

Don Methven, Wireless Video Streaming: An Overview, Nov. 16, 2002, 7 Pages.

* cited by examiner

FIG-4

Tabs: Home | Network Settings | System Settings | Display Status | Unit Upgrades Left menu:
- Set Time
- Set Password
- Save Configuration
- Shell Command
- Standby Mode
- Brightness Control
- SNMP Setting
- Reboot Display Name: Display1

The current data / time is: 12/31/1969 19:04:49

To change the time, enter the values in this format: mm/dd/yyyy hh:mm:ss

[12] / [31] / [1969]
[19] : [04] : [49]

[Submit]

FIG-5

Tabs: Home | Network Settings | System Settings | Display Status | Unit Upgrades Left menu:
- Set Time
- Set Password
- Save Configuration
- Shell Command
- Standby Mode
- Brightness Control
- SNMP Setting
- Reboot Display Name: Display 1

Current Web Password       [          ]
New Web Password           [          ]
Re-type Web Password       [          ]

[Submit]

| Home | Network Settings | System Settings | Display Status | Unit Upgrades |

- Set Time
- Set Password
- Save Configuration
- Shell Command
- Standby Mode
- Brightness Control
- SNMP Setting
- Reboot Display Name: Display1

Click here to save unit configuration to file

FIG-6

| Home | Network Settings | System Settings | Display Status | Unit Upgrades |

- Set Time
- Set Password
- Save Configuration
- Shell Command
- Standby Mode
- Brightness Control
- SNMP Setting
- Reboot Display Name: Display 1

Standby Mode          [Disabled ▼]
                      [Submit]

Tabs: Home | Network Settings | System Settings | Display Status | Unit Upgrades Side menu:
- Set Time
- Set Password
- Save Configuration
- Shell Command
- Standby Mode
- Brightness Control
- SNMP Setting
- Reboot Display Name: Display1

| Field | Value |
|---|---|
| Dynamic Brightness Control | Disabled |
| Ambient Sensor Location | Front & Back |
| High Ambient Reading | 1500 |
| Fixed Brightness Value | 400 |
| Desired High Nits | 600 |
| Desired Low Nits | 360 |

Submit

FIG-9

Tabs: Home | Network Settings | System Settings | Display Status | Unit Upgrades Side menu:
- Set Time
- Set Password
- Save Configuration
- Shell Command
- Standby Mode
- Brightness Control
- SNMP Setting
- Reboot Display Name: Display 1

SNMP Community String: mn

Submit

| | Home | Network Settings | System Settings | Display Status | Unit Upgrades |
|---|---|---|---|---|---|

Basic Status

Downtime Incidents

Upload Status

Name: Display1

| | |
|---|---|
| Run Time Since Last Power Up | 0 Days, 0 hrs, 8 mins, 54 sec |
| Num Active Downtime Incidents | 0 |
| Display Serial Number | ACM0024MU |
| Board Revision | B0 |
| Redboot Version | XYZ release, version 2.04.3 - built 16:00:21, Jul 16 2008 |
| Kernel Version | #10 Sun Mar 8 10:43:43 EDT 2009 |
| Root Filesystem Version | Revision 2.1.9 - Fri Aug 21 10:37:58 EDT 2009 |
| XYZ Filesystem Version | Revision 4.2.2 - Wed Jan 6 13:11:59 EST 2010 |
| Total Elapsed Run Time | 0 days, 7 hours, 38 mins, 15 secs |
| Total Backlight On Time | 0 days, 4 hours, 52 minutes |
| Total Valid DVI Input Time | 0 days, 0 hours, 26 minutes |
| DVI Input Status | Valid Resolution |
| DVI Input Resolution | 1920x1080 |
| AC Inlet Current | 4.66 AMPS |
| Power Supply 1 Status | OK |
| Power Supply 1 Current | 5.6 AMPS |
| Power Supply 1 Temperature | 41.8 |
| Power Supply 2 Status | OK |
| Power Supply 2 Current | 5.6 AMPS |
| Power Supply 2 Temperature | 46.7 |
| Power Supply 3 Status | OK |
| Power Supply 3 Current | 6.6 AMPS |
| Power Supply 3 Temperature | 46.7 |
| Air Outlet Temperature | 28.1 |
| Backlight Case Temperature | 29.0 |
| Front Ambient Light Reading | 15 |
| Rear Ambient Light Reading | 1414 |
| Display Brightness | 397 nits |
| Desired Brightness | 400 nits |
| Dynamic Backlight Control | Disabled |
| Backlight Light Reading | 41208 |
| DAC Setting | 8653 |
| Fan PWM1 Setting | 22% |
| Fan PWM2 Setting | 18% |
| Fan1 Tach Reading | 3900 |
| Fan2 Tach Reading | 4080 |
| Fan3 Tach Reading | 4740 |
| Fan4 Tach Reading | 4980 |
| Fan5 Tach Reading | 4860 |
| Fan6 Tach Reading | 4860 |
| Fan7 Tach Reading | 3960 |
| Fan8 Tach Reading | 4020 |
| Number of Active Errors | 0 |
| Number of Sensor Reads | 141 |
| Number of Verify Errors | 0 |
| Average Sensor Deviation | 0.20% |
| High Ambient Contrast Ratio | 62.89 |

FIG-11

| Home | Network Settings | System Settings | Display Status | DTU Upgrades |

Edit Network Settings

Transmitter: Xmitter

Receiver: 192.168.2.3 Pump1

Operation successful

| | |
|---|---|
| Access Point | 00:0E:8E:0F:D5:C0 |
| Host Name | [ Pump1 ] |
| IP Address | 192.168.3.3 |
| SSID | XYZwireless2 |
| WPA2 Passphrase | ************ |
| Wireless Channel | 52 |
| Wireless Transmitter Rate | 12 Mb/sec |
| Acceptable Frame Rate | 20 fps |
| Signal Quality | 46 |
| | [ Submit ] |

Return to transmitter pages

FIG-14

| Home | Network Settings | System Settings | Display Status | Receiver List | DTU Upgrades |

Basic Status
Downtime Incidents
Upload Status

Transmitter: Xmitter

Operation successful
Downtime Incidents Since Reset        6

[ Reset Downtime Incidents ]

Uptime                    3 Days, 1 h, 47m, 48s
Current Time              Fri Dec 19 15:25:31 2008

1
Date                  Fri Dec 19 15:25:31 2008
Cause                 No Input Signal
Duration              0 Days, 0 h, 0m, 7s 2
Date                  Fri Dec 19 15:25:31 2008
Cause                 Input Datastream Timeout
Duration              0 Days, 0 h, 0m, 8s 3
Date                      Fri Dec 17 10:48:58 2008
Cause                     Input Datastream Timeout
Duration                  0 Days, 0 h, 0m, 1s 4
Date                      Fri Dec 19 15:25:31 2008
Cause                     Input Datastream Timeout
Duration                  0 Days, 0 h, 2m, 13s

SYSTEM AND METHOD FOR REMOTELY MONITORING THE OPERATING LIFE OF ELECTRONIC DISPLAYS

CROSS-REFERENCE TO RELATED APPLICATIONS

This application is a non-provisional of U.S. Application No. 61/308,139 filed Feb. 25, 2010 and is hereby incorporated by reference as if fully cited herein. This application is a non-provisional of U.S. Application No. 61/312,892 filed Mar. 11, 2010 and is hereby incorporated by reference as if fully cited herein.

TECHNICAL FIELD

Exemplary embodiments generally relate to systems and methods for remotely monitoring and communicating with one or more electronic displays.

BACKGROUND OF THE ART

Electronic displays have previously been used predominantly in indoor entertainment applications such as home theatres and bars/restaurants. However, as the performance characteristics and popularity have grown, electronic displays are now being used in many new environments for both entertainment as well as informational and advertising purposes. Displays are now used in airports, shopping malls, sides of buildings, arenas/stadiums, menu boards, and as advertising signs and/or billboards. Some displays are also used for both indoor and outdoor environments.

Over many hours of use, even the most reliable electronic displays are know to degrade in performance or possibly have one or more components fail prematurely. When a display is used for advertising purposes, a sudden failure or degradation in performance can result in the loss of critical advertising exposure and a possible loss of revenue to the advertising firm. Further, when a display is used for information, a failure of the display may result in the loss of critical information such as flight schedules or emergency alerts. Also, in some applications a display may be required to maintain a certain level of performance (ex. gamma saturation, contrast, luminance, color saturation, etc.). A user may want to monitor the various parameters of the display to determine when the display may begin to degrade in performance. In some applications, many displays may be mounted in a particular location. For example, some airports or transit stations may contains hundreds of displays. It may be desirable for a user to have the ability to monitor the performance characteristics of one or more displays from a remote location.

Still further, in some applications there may be several displays used closely with one another (sometimes as an array of displays). In these types of applications it may be preferable to have each display maintain similar performance characteristics, so that the displays appear uniform when viewed as a whole.

SUMMARY OF THE EXEMPLARY EMBODIMENTS

Exemplary embodiments provide communication between one or more displays with a user through an internet or local area network (LAN) connection. In some embodiments this communication would be two-way communication. Electronic data may be sent from one or more displays to a user for monitoring the displays, ensuring adequate performance for the customer, gathering data for reliability research and analysis, as well as diagnosing and possibly fixing some display problems remotely.

Exemplary embodiments may display a predetermined watermark on the display and measure the characteristics of the watermark through one or more color light sensors which are embedded within the display. The color light sensor provides feedback data regarding any number of performance characteristics of the display. The data may be stored internally within the display for a certain amount of time (or until the local storage is full) and may be sent to a user remotely when requested. The data can indicate failures in some of the display components and can also provide input as to the actual performance of the display. Some end-users require specific performance characteristics of their displays and embodiments help to collect the data which can determine whether the displays are meeting the required characteristics. The data can be plotted and analyzed in a number of ways to evaluate the performance of the display.

The foregoing and other features and advantages will be apparent from the following more detailed description of the particular embodiments of the invention, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIGS. 2-12 show a series of screenshots for an exemplary user interface for accessing status information about the display;

FIGS. 14-18 show a series of screenshots for an exemplary user interface for accessing status information about both the transmitters and the displays.

DETAILED DESCRIPTION

Figure 1:
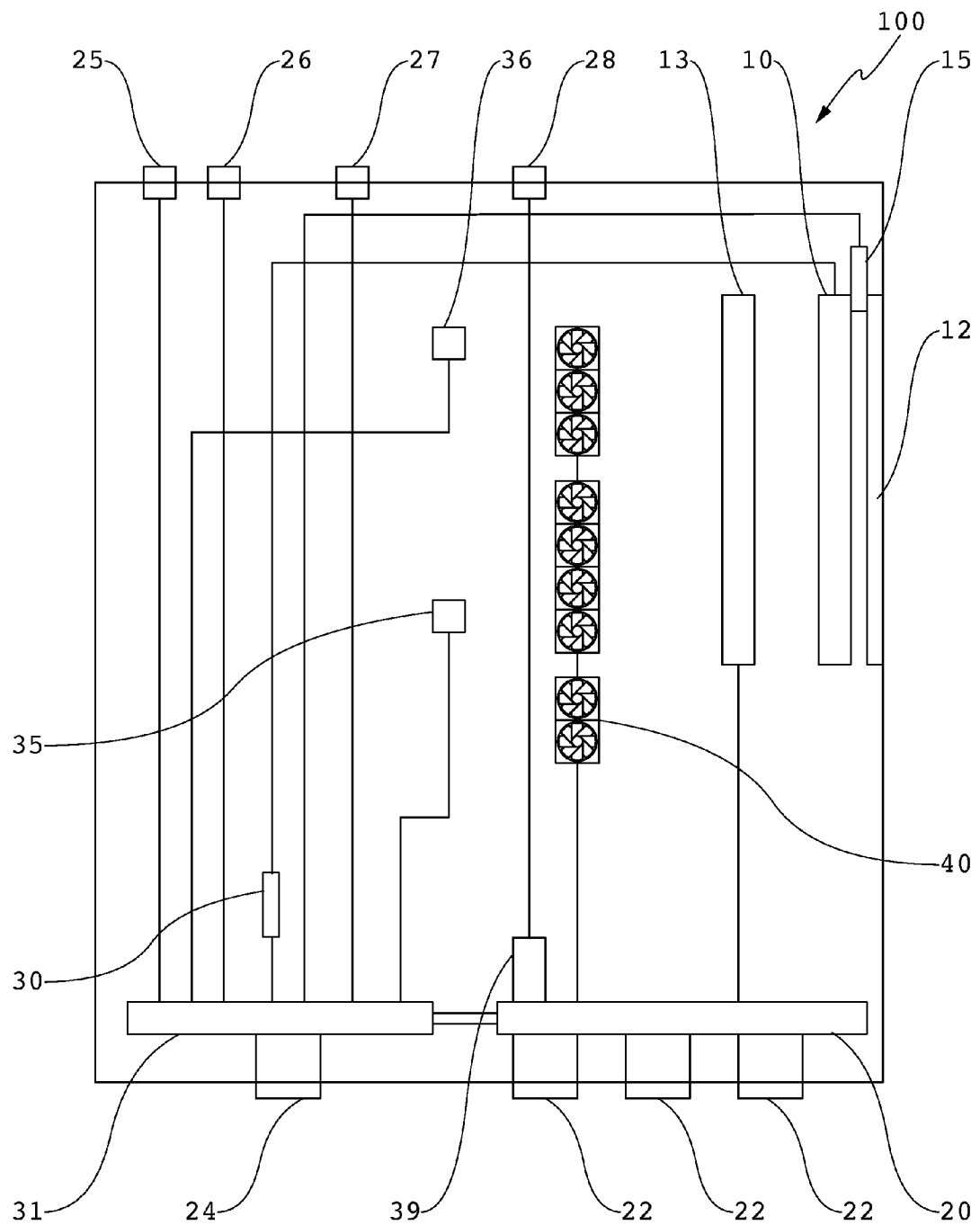
FIG. 1 is shows an electrical block diagram for an exemplary display which contains an embodiment of the display performance monitoring system.

FIG. 1 shows an electrical block diagram for an exemplary display 100 which contains an embodiment of the display performance monitoring system. A color light sensor 15 may be placed in front of the display assembly 10. In this embodiment, the color light sensor 15 is placed between the display assembly 10 and the front display plate 12 which may protect the display from damage or provide additional optical properties (anti-reflection, polarizing, optical matching, light absorption, etc.). The specific embodiment shown here could be used with an LCD display, where the display assembly 10 may be an LCD stack with an associated backlight assembly 13 placed behind the LCD stack. Obviously, with other embodiments using other types of display assemblies, a backlight assembly 13 may not be necessary. For example, an organic light-emitting diode (OLED), light emitting polymer (LEP), or electroluminescent display may be used as the display assembly 10 where a backlight would not be required.

The display assembly 10 may be in electrical communication with a timing and control assembly (TCON) 30. The color light sensor 15 and TCON 30 may be in electrical communication with a signal backplane 31. If a backlight assembly 13 is used, it may be connected to a power backplane 20 which may also be connected to one or more power module assemblies 22. A temperature sensing device may be placed on or near each power module assembly 22 in order to measure the temperature of the power module assembly 22. A display controller assembly 24 may also be in electrical communication with the signal backplane 31. The power backplane 20 may be in electrical communication with the signal backplane 31. The display controller assembly 24 may include several different components including, but not limited to a video receiving unit, decompressor, and display interface board (DIB). In some embodiments, the TCON 30 may be incorporated into the display controller assembly 24.

Other elements may also be in electrical communication with the signal backplane 31, including but not limited to an ambient light sensor 35 and a backlight sensor 36. An ambient light sensor 35 may be used to detect the amount of ambient light which is present. A backlight sensor 36 may be used to detect the level of luminance that is being produced by the backlight assembly 13 (if used). Exemplary embodiments may also utilize a plurality of temperature sensing devices, placed in electrical communication with a backplane and placed to sense the temperature of the backlight 13, display assembly 10, power module assemblies 22, inlet/exit air temperatures, and the exterior environment temperatures.

The display may contain several input/output interfaces. A video input 25 accepts the video data from a video source and may connect to the signal backplane 31 or may connect directly to the display controller assembly 24. An RS232 interface 26 as well as an Ethernet/network interface 27 may be used to provide communication between the various display components and the user. The RS232 interface 26 may use standard levels and signals to allow connection to a personal computer. The Ethernet/network interface 27 may provide automatic sensing to allow connection directly to a PC or network hub. Through one or both of these interfaces 26 and 27, the user can communicate with the display to accomplish a variety of different objectives. It should be noted that this is only one embodiment for the input/output interfaces for a display. Other embodiments may not use the RS232 interface 26 and instead would only use the Ethernet/network interface 27. In wireless applications, a wireless network card (or other type of wireless transmitting/receiving device) may be used to both receive the video data and communicate with the user over a network connection. In these embodiments, the wireless network card may replace the RS232 interface 26, Ethernet/network interface 27, and the video input 25. The wireless application will be discussed further below.

A power input 28 may be connected to the power backplane 20. A current monitoring device 39 may be placed between the power input 28 and the power backplane 20 in order to measure the power consumption of the display. One or more fans 40 may be used to cool the display and may be electrically connected to the power backplane 20.

Although shown in the figure with a signal backplane 31 and a power backplane 20 as separate elements, this may not be used in all embodiments. In some embodiments, the power and signal backplanes may be incorporated into a single backplane.

A color light sensor 15 may be placed in front of the display assembly 10 so that it may detect various properties of the display assembly 10. In some embodiments, a pre-determined watermark may be displayed on the display assembly 10 and measured/analyzed by the color light sensor 15. The watermark may be generated by one or more components of the display controller assembly 24, TCON 30, or any other local storage/control assembly. The watermark may be automatically created by the display or may be shown when directed by the user. The watermark may be a grouping of image elements (ex. pixels) on the display which are selected to display a specific color or set pattern of colors for measurement by the color light sensor. The watermark can be placed anywhere on the display, but since the color light sensor should preferably be placed in front of the display, the watermark should preferably be placed in a corner or near the edge of the display so that the image is only disrupted a minimal amount. In some embodiments, the watermark may simply be a small shape showing a solid color (ex. Red (R), Green (G), Blue (B), or White (W)). The watermark may show each color for a predetermined amount of time while its properties are measured by the color light sensor 15. For example, the watermark may cycle through squares/rectangles of the following colors in the following times: T1=R, T2=G, T3=B, T4=W, T5=R, etc.

In one embodiment, when the display is initially installed it may be inspected to determine that it is operating properly. Then, once the watermark begins to be displayed, the measurements of the color light sensor may be stored as the reference points for comparison throughout the life of the display. Once the color light sensor determines that the measurements have fallen outside of an acceptable range, this may be indicated to the user (either automatically or when the user requests the data) and the display may need certain parameters reset or may possibly need serviced and/or replaced. In other embodiments, the required measurement values from the color light sensor may be pre-determined and stored within the display controller assembly 24. Then during the life of the display, the measurements from the color light sensor 15 are compared with these pre-determined values and when they fall outside the acceptable range, an error may be reported to the user.

Some embodiments may not report errors out to the user immediately, but instead may simply store the data internally for later retrieval by the user. Once the data is retrieved and analyzed it can be determined that the display has malfunctioned and may continue to malfunction.

Exemplary embodiments may provide constant feedback on the performance of the display 100 and can quickly notify the user that the display 100 is not functioning properly. Notifications may be sent to the user's PC through the RS232 interface 26 or to any remote location using the Ethernet/network interface 27. A variety of internet notifications could be sent to the user through the Ethernet/network interface 27. Notifications could include email, instant messaging, text messaging, or a web page which can be accessed by the user and may contain the data for a number of different displays (discussed further below). Prior to the exemplary embodiments herein, a user would have no notice of a malfunctioning display unless actually observed by the user. As discussed above, a user may have many displays in operation and it may be difficult or impossible to closely monitor them. The display may have been malfunctioning for some time before the user actually notices the failure. In some situations, even actual observation may be difficult since some display parameters are sometimes difficult or impossible to notice by simply looking at the display with the naked eye.

The display may generate and display the same watermark regardless of the video which is being displayed.

Alternatively, each video stream may include its own specific watermark. This method would be advantageous as it would permit a measurement of the precise amount of time that each video is being displayed. This would allow an advertising firm to determine exactly how long each client's advertisements were shown on which specific displays. This can be advantageous when many different displays are being used to advertise for many different clients. This would also permit very precise and accurate billing to the clients of the advertising firm.

The embodiments herein allow for a near instantaneous detection of failures in communication between display components, including but not limited to the TCON, DIB, display assembly, and all of the cabling/connections in between. In addition to the monitoring of the display components for proper operation, a number of different display parameters can be monitored by the embodiments described herein, including but not limited to: gamma saturation, contrast, luminance, and color saturation.

As an advanced embodiment of the setup described herein, each bit level for each color may be measured to determine if it is working properly. For example, with a typical LCD display, the luminance level for each subpixel (red, green, and blue) may be defined by 8 bits. Thus, each subpixel can vary from Gamma 0 (black) to Gamma 255 (full on). To test the red subpixels for this example, the bits can vary from: 00000000 (black), 00000001, 00000010, 00000100, 00001000, 00010000, 00100000, 01000000, 10000000, 11111111 (full on). By driving the red subpixels at each bit variation and measuring the output by the sensor, it can be determined if each bit level is functioning properly. Obviously, this can be repeated for the green and blue subpixels.

Many types of color light sensors would work with the embodiments described herein. An exemplary color light sensor is the TCS3404CS or TCS3414CS which are commercially available from Texas Advanced Optoelectronic Solutions® (TAOS) of Plano, Tex. www.taosinc.com. The TAOS specification document TAOS068 entitled 'TCS3404CS, TCS3414CS Digital Color Light Sensors' is herein incorporated by reference in its entirety.

Various display types can be used with the embodiments described herein, including but not limited to LCD, plasma, LED, organic LED, light-emitting polymer, field emission display, and organic electro luminescence. As discussed above, some of these displays may not require a backlight assembly. Embodiments may be used with displays of other types including those not yet discovered.

Figure 2:
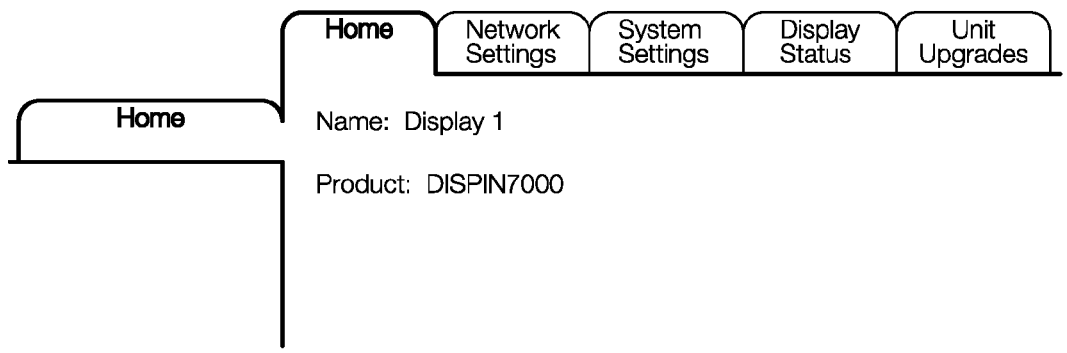
Figure 3:
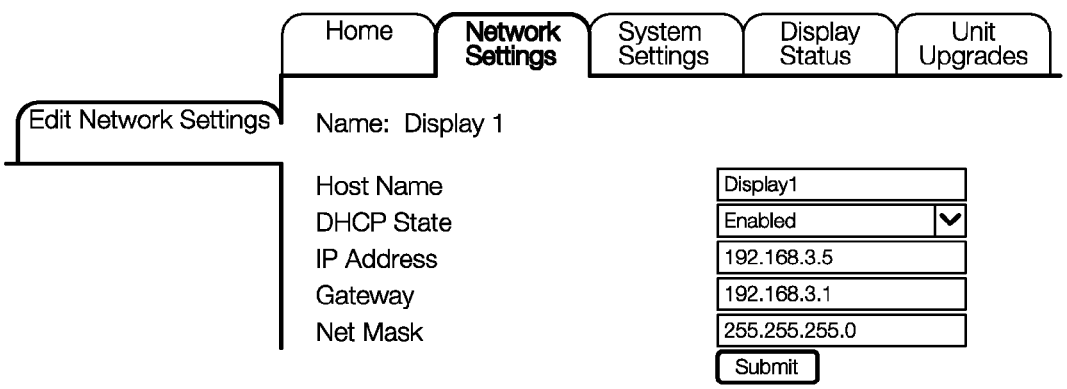

FIG. 2 provides a screenshot of a user interface for monitoring the performance of a display. This screen shot shows the 'Home' tab which provides the name of the display and the specific product. FIG. 3 provides a screen shot of an exemplary Network Settings tab. With this menu, the user can view and/or modify the Host Name, DHCP State, IP Address, Gateway, and Net Mask settings. The Host Name can simply allow the user to utilize a meaningful name for the display, or perhaps indicate its location. The DHCP State may be 'disabled' when the IP address is to be a fixed address. The DHCP State may be 'enabled' when it is desirable to assign the IP address automatically by the network router. The IP Address may be used for the purposes of remote status and monitoring and should preferably be a known IP address on the company intranet. The Gateway is the IP address of the upstream connection that the system may use for all outgoing network communications. The Gateway value should preferably be assigned during installation. The Net Mask setting is the network mask value for the upstream connection that the system may use for all outgoing network communications. After the user enters any Network Settings, pressing the 'Submit' button will allow the system to accept the values. The display may reboot.

FIG. 4 provides a screenshot for the Set Time section of the System Settings tab. Under this section, the time/date settings for the display may be controlled. For security reasons, FIG. 5 provides the Set Password section of the System Settings tab where a password can be used to control access to the display. FIG. 6 indicates the Save Configuration section where the displays configuration may save all system parameters to a configuration file. The Shell Command section may be setup for maintenance purposes. FIG. 7 shows the Standby Mode section where the user can enable or disable the ability to operate the display for a period of time with the backlight off.

FIG. 8 provides the various parameters of the Brightness Control section of the System Settings tab where the user may set the brightness of the display to by dynamically controlled based on ambient light conditions or set to a fixed value. Enabling the Dynamic Brightness Control allows the brightness to be automatically adjusted based on ambient light conditions. Disabling the Dynamic Brightness Control allows the user to set and maintain the brightness level at a constant value (as supplied by the Fixed Brightness Value). The Ambient Sensor Location allows the user to select the location of the ambient light sensor. The High Ambient Reading allows the user to select a value for the ambient light sensor where once this value is read by the ambient light sensor, the backlight is driven at the Desired High Nits Value. The Fixed Brightness Value is the chosen constant brightness value when the Dynamic Brightness Control is Disabled. The Desired High Nits is the desired brightness level in nits during high ambient light conditions. This value may only affect the brightness level when the Dynamic Brightness Control is set to Enabled. Desired Low Nits is the desired brightness level in nits during low ambient light conditions which is also takes effect only when the Dynamic Brightness Control is set to Enabled.

Figure 10:
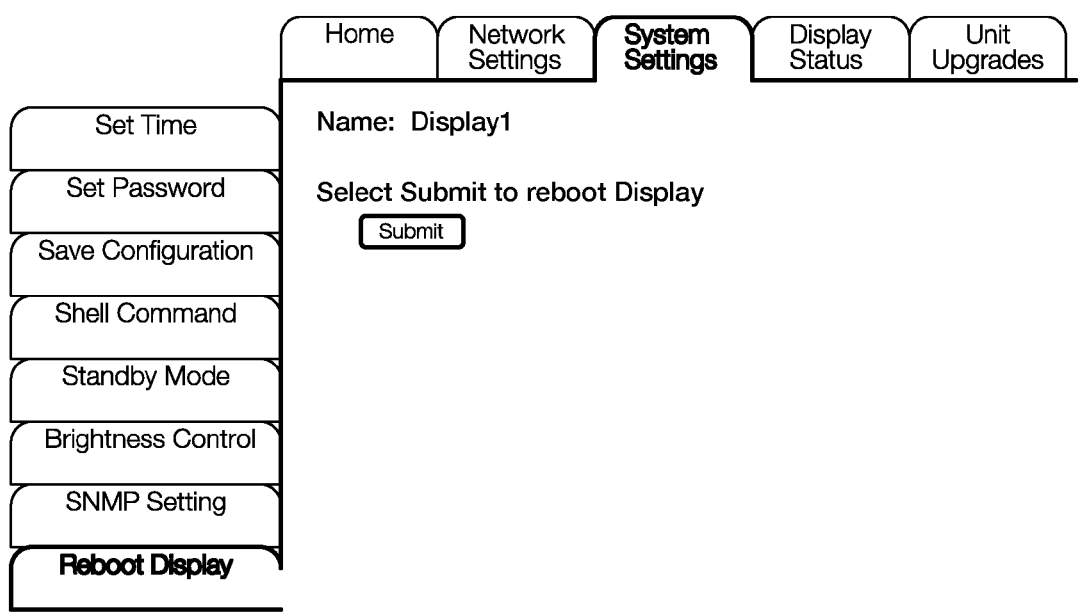

FIG. 9 provides the SNMP Settings section where a user may utilize an SNMP Manager if the SNMP Community String is configured. FIG. 10 provides the Reboot Display section of the System Settings tab where the user can reboot the display.

FIG. 11 shows an embodiment for a display page where the Display Status tab has been selected along with the Basic Status section. As shown in this figure, a large amount of information can be shown to the user on this page. This data could be recorded, sorted, and/or plotted in any way that is convenient to the user. Any type of 'data dump' into a familiar format (ex. Excel or Numbers) for the user could also be accomplished. Specifically, the data for the power supply(s) (power module assemblies) can be viewed, including the status, current draw, and temperature. Further, additional temperature sensing devices can be placed throughout the display to provide temperature data, as shown in FIG. 11. Each temperature sensing device is preferably placed in electrical communication with a backplane.

As shown in the Figure, the temperature, current draw, and status of each power module (power supply) can be accepted and displayed. Operating parameters can be pre-chosen for the power modules so that if the temperature or current strays outside of an acceptable range, then the Status indication changes from OK to BAD.

Figure 12:
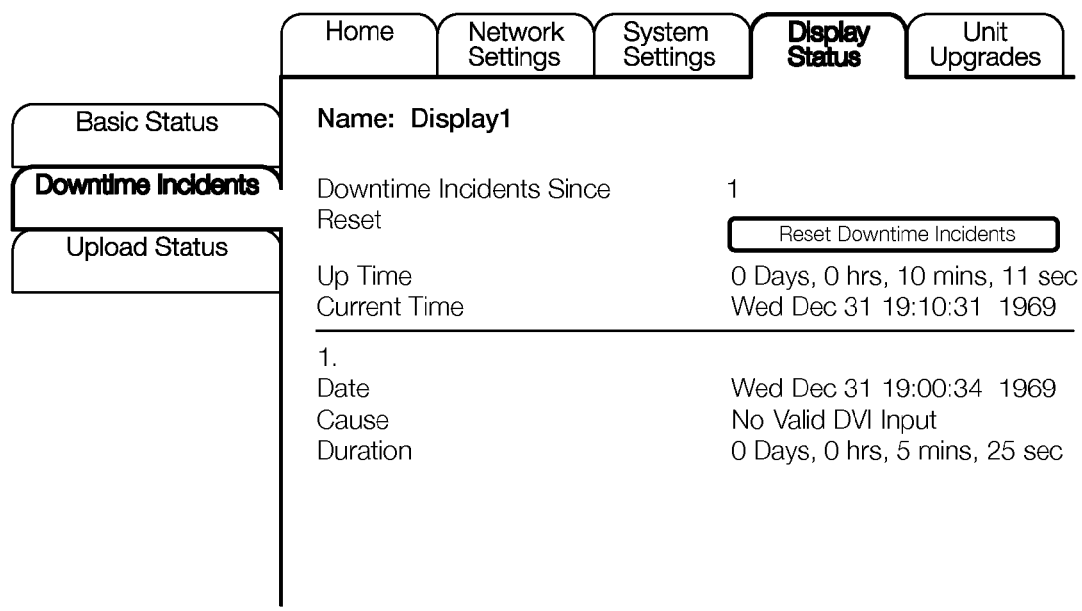

FIG. 12 shows an embodiment for a display page where the Display Status tab has been selected along with the Downtime Incidents section. For each downtime incident, the date, cause, and duration of the incident may be recorded and displayed to the user. The downtime incidents may be reset at any time.

Figure 13:
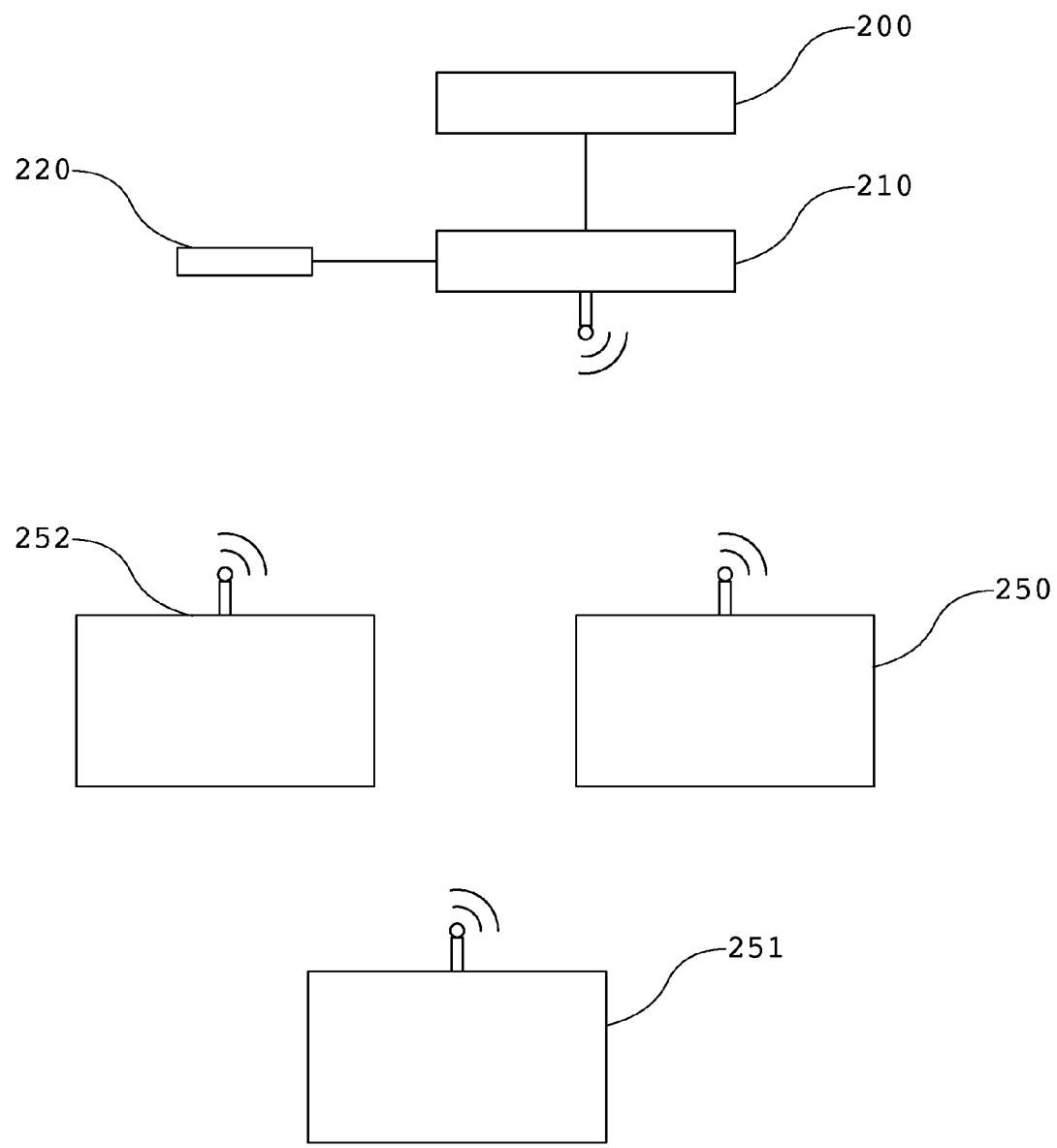
FIG. 13 is an embodiment of the display performance monitoring system when using a wireless transmitter and several displays.

FIG. 13 shows an embodiment of the display performance monitoring system when using a wireless connection with several displays. In this embodiment, a video player 200 provides the video (and optional audio) data to the transmitter 210. The transmitter 210 may be in two-way wireless communication with several displays 250, 251, and 252. The transmitter 210 may also be in communication with an internet connection and/or network hub 220 so that a user may access information from the displays/transmitter from any internet and/or network connection.

With embodiments such as the one shown in FIG. 13, separate user interfaces (sometimes web pages) may be created for the transmitter as well as each display (i.e. receiver). FIG. 14 provides a screenshot for a display page. Now that a wireless setup is being used, various data regarding the wireless system can be observed as it relates to the display. As shown in the figure, SSID, WPA2 Pass Phrase, Wireless Channel, Wireless Transmit Rate, Acceptable Frame Rate, and Signal Quality can all be viewed from the Network Settings tab of the display page. A link may be provided to return to the transmitter pages. In an exemplary embodiment, to communicate with the display, a user should preferably establish a physical connection with the Ethernet/network port of the display, either directly or through a crossover cable or via a network switch.

Figure 15:
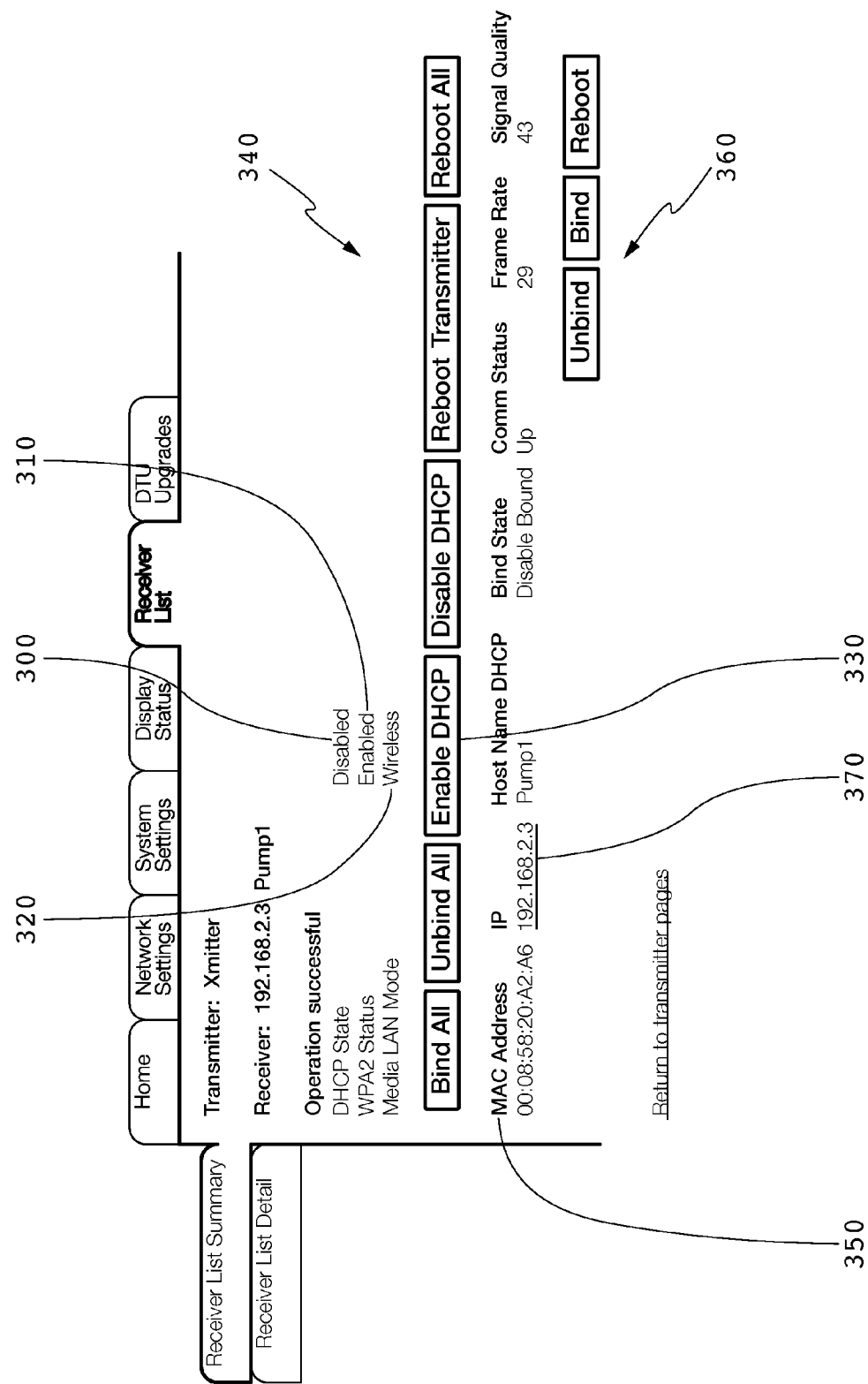

FIG. 15 shows an embodiment for a transmitter page where the Receiver List tab has been selected. This tab may provide the data for each receiver 350 that is connected to the transmitter, in a row format. This can provide a quick view for the user to determine the status of the entire site/location. The rows may be colored coded so that a user can quickly determine if a display/receiver is not performing well. The DHCP Status 300 and WPA2 Status 310 are both shown. During installation, it may be preferable to enable DHCP and disable WPA2. When the displays and transmitters are initially powered up, the displays may use DHCP to connect to a valid transmitter and may begin displaying any transmitted video data. Once this has been done, the transmitter should be connected via a switch on the same network or a crossover connection. The transmitter may be given a default IP address and by connecting a computer which is on the same subnet but with a different IP address the computer may begin communications with the transmitter. It may then be preferable to Bind 360 some or all of the displays in communication with the transmitter (the binding process is discussed further below). It may then be preferable to Disable DHCP 330 and Reboot 340 the system. At this point it may be preferable to enable WPA2 security, which can be accomplished by entering a Pass Phrase under the Network Settings tab (discussed further below). Each row showing the connected receivers may contain a hyperlink 370 which will connect to the page for the particular receiver.

In various embodiments, the transmitters and receivers may be designed to work together by default, without binding. However, in an exemplary embodiment the transmitters and receivers would utilize binding for optimal system performance. In some cases, such as multiple transmitter installations, binding may be required. The principle behind binding is to tell a transmitter that a given set of receivers should always be communicating and receiving video and sometimes audio. If one of the receivers stops responding, the transmitter may flag this receiver and report this to a user using a remote monitoring system or web-based user interface. If there is no binding, the transmitter does not expect the receiver to be there and may not recognize that a receiver has a failure. When all receivers are bound to a transmitter, a preferred embodiment may disable DHCP.

When multiple (N) transmitters are used in the same location, it may be preferred to change the wireless SSID and the wireless channel for at least N−1 of the transmitters. The basic setup as discussed above may be followed for each transmitter. Then, a user may access the Network Settings tab (shown below) for each transmitter in order to change the wireless SSID and wireless channel.

Figure 16:
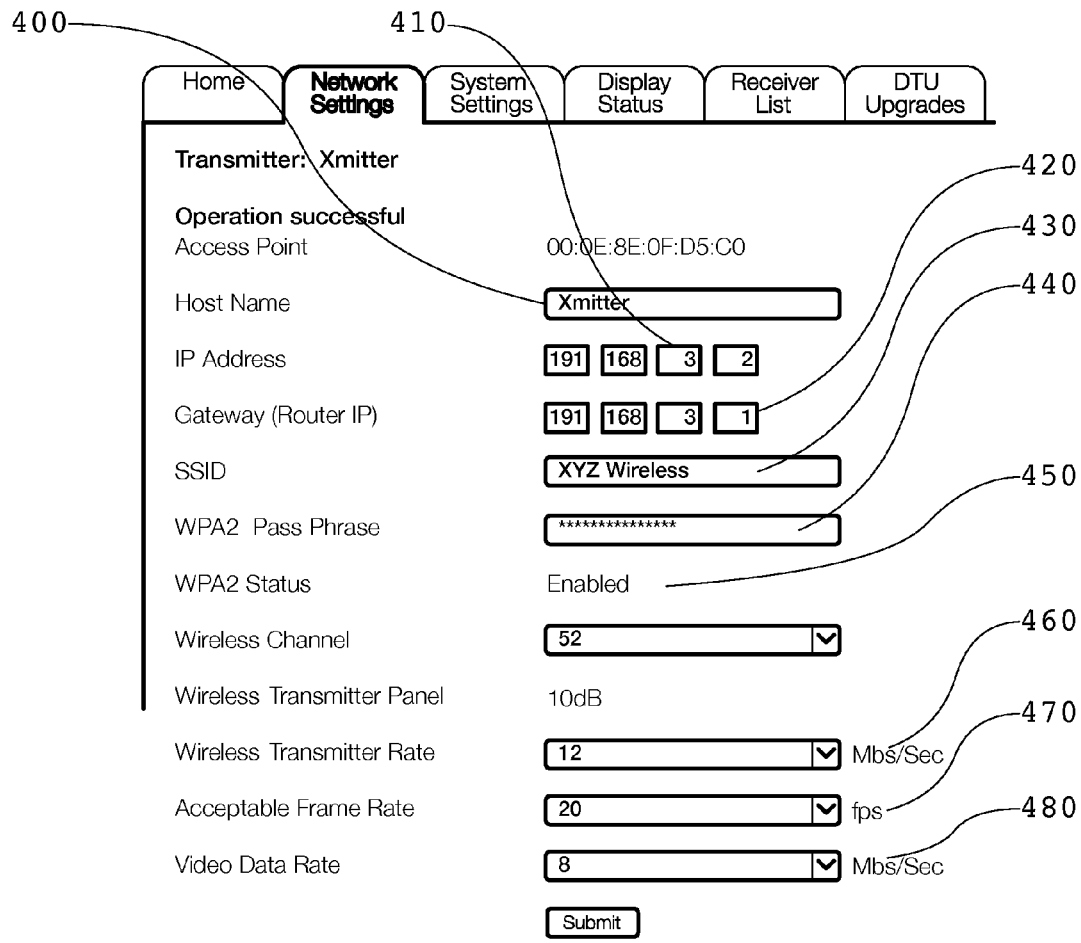

FIG. 16 shows an embodiment for a transmitter page where the Network Settings tab has been selected. Here, the Host Name 400 can be changed. The IP Address 410 may be entered to allow remote status and monitoring. It is preferable that the IP Address 410 is a statically allocated IP address on the company intranet. The Gateway IP address 420 may be entered, which may be the address of the upstream connection that the system will use for outgoing network communications. As discussed above regarding 'binding', and especially when using a multiple transmitter system, the SSID 430 may be changed. If using a single transmitter system, the SSID 430 may not require any action by the user. The WPA2 Passphrase 440 may be entered to allow WPA2 security to be enabled. When using multiple transmitter systems, the Transmission Channel 450 may be altered so that a different wireless channel could be used for each transmitter. This may reduce the interference between wireless systems. Even in some single transmitter setups, it may still be advantageous to experiment with different wireless transmission channels to find one that works the best for the particular setup and location.

In some applications, it may be desirable to alter the Wireless Transmission Rate 460. Sometimes, it may improve the video/audio throughput if the Wireless Transmission Rate 460 is lowered. As a general rule, it may be preferable to always keep the Wireless Transmission Rate 460 set at least 2 Mbps greater than the Video Data Rate 480. A Minimum Acceptable Frame Rate 470 may be selected where if the frame rate of the video stream drops below this value, a default image or logo may be displayed instead. The Video Data Rate 480 can also be adjusted which essentially controls the level of compression for the transmitted video source. As noted above, it may be preferable to keep this value less than the Wireless Transmission Rate 460 discussed above.

FIG. 17 shows an embodiment for a transmitter page where the Display Status tab has been selected along with the Downtime Incidents section. Similar to this tab and section for a display, similar data can be shown for the transmitter as well. Thus, for each downtime incident, the date, cause, and duration of the incident may be displayed. Also, the downtime incidents may be reset.

Figure 18:
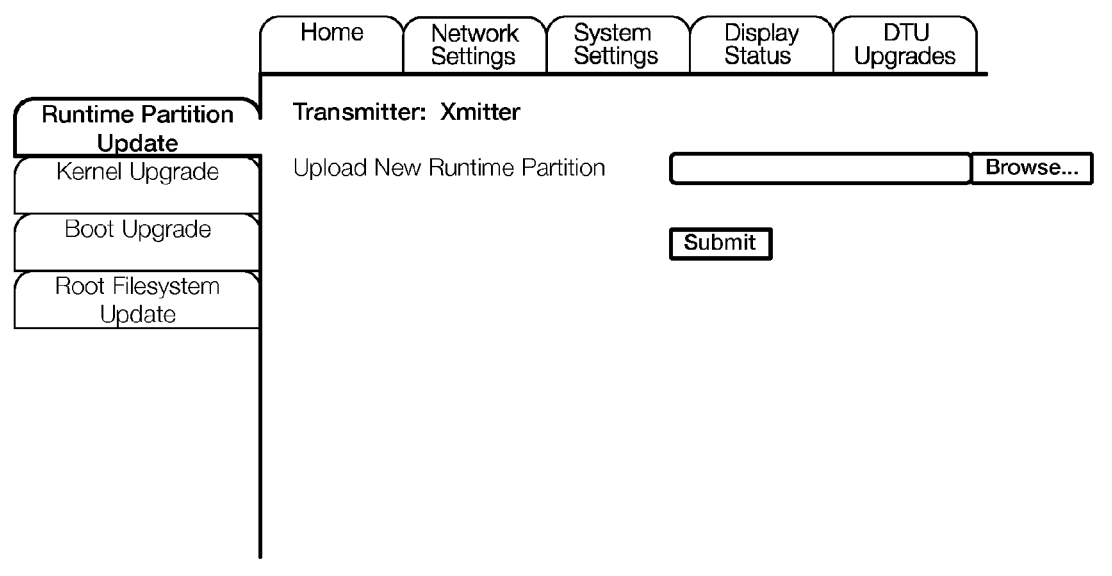

FIG. 18 shows an embodiment for a transmitter page where the DTU Upgrades tab has been selected. On this page, a user can update various types of software for the transmitter and displays. Because each type of software may require a different installation process, different sections may be created for each type of software to be updated. In this embodiment, four sections under the DTU Upgrades tab are shown: Runtime Partition Update, Kernel Update, Boot Update, and Root Filesystem Update. A user can simply select the type of software update, click 'Browse' to find the appropriate update, and 'Submit'.

The various embodiments for the user interface shown in the figures above can be run on any type of computing device. As is known in the art, any computing device with a processor can operate software to accomplish the tasks of the user interface shown and described above. Typical devices contain an electronic storage medium in electrical communication with a processor, a display, and a network communication port. Thus, the user interface shown and described herein can be operated on any computing device including but not limited to: personal computers, tablet computers, smart phones, and any other device with a processor for running software. The user interface may be web-based for running on any personal computing device with an internet connection or may be designed for local use (LAN).

It should be noted that the times/dates for the information shown on the various user interfaces was arbitrary and simply selected to show the various embodiments of the system. The times/dates which are shown in no way indicate that activity regarding the various embodiments actually occurred on those dates.

Having shown and described preferred embodiments, those skilled in the art will realize that many variations and modifications may be made to affect the described embodiments and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

The invention claimed is:

1. A system for remotely monitoring and controlling an electronic display comprising:
   a first electronic display having a backplane in electrical connection therewith;
   a color light sensor placed in front of the first electronic display and electrically connected with the backplane;
   a network connection with the backplane; and
   a computing device residing at a location remote to and not visible from the first electronic display, the computing device having a second display, change controlling software, and an electronic storage medium populated with operating parameters, the computing device in electronic communication with the network connection and adapted to display a user interface on the second display, the user interface configured to present the current brightness level of the first electronic display and to accept as an input a new brightness level to be provided via the change controlling software to the first electronic display if the current brightness level of the first electronic display is determined to fall outside of corresponding acceptable operating parameters saved on the electronic storage medium.

2. The system of claim 1 further comprising:
   a power module electrically connected with the backplane.

3. The system of claim 2 wherein:
   the user interface is adapted to display the current draw of the power module.

4. The system of claim 2 wherein:
   the user interface is further adapted to display the temperature of the power module.

5. The system of claim 1 further comprising:
   a fan placed electrically connected with the backplane.

6. The system of claim 5 wherein:
   the user interface is adapted to display the speed of the fan.

7. The system of claim 1 further comprising:
   an AC current monitoring device electrically connected with the backplane.

8. The system of claim 7 wherein:
   the user interface is adapted to display the data from the AC current monitoring device.

9. The system of claim 1 wherein:
   the first electronic display is a liquid crystal display.

10. The system of claim 1 wherein:
    the first electronic display is an OLED display.

11. The system of claim 1 wherein:
    there are a plurality of first electronic displays, each first electronic display having:
    a display assembly,
    a backplane in electrical connection therewith,
    a color light sensor placed in front of each first electronic display and electrically connected with the backplane thereof, and
    a network connection with the backplane; and
    wherein the computing device is adapted to communicate with each first electronic display device, and the user interface is adapted to present sensor data from each first electronic display device and to allow new input values to be provided thereto.

12. A system for remotely monitoring and controlling a liquid crystal display (LCD), the system comprising:
    an LCD having a backlight;
    a backplane electrically connected with the LCD and backlight;
    a light sensing device placed to measure the light emitted from the backlight and electrically connected with the backplane;
    at least one temperature sensing device electrically connected with the backplane and placed to measure at least one temperature of the LCD and;
    a fan placed to draw cooling air over the backlight and electrically connected with the backplane;
    a network connection with the backplane; and
    a computing device residing at a location remote to and not visible from the LCD, the computing device having a second display, change controlling software, and an electronic storage medium populated with operating parameters, the computing device in electronic communication with the network connection and adapted to display a user interface on the second display, the user interface configured to present data from the light sensing device, the fan and the at least one temperature sensing device, and to accept as an input new backlight emission levels and new fan speeds to be provided via the change controlling software to the LCD if the light from the backlight as measured by the light sensing device or a temperature of the LCD as measured by the at least one temperature sensing device is determined to fall outside of corresponding acceptable operating parameters saved on the electronic storage medium.

13. The system of claim 12 wherein:
    the network connection is a wireless network.

14. The system of claim 12 further comprising:
    a power module electrically connected with the backplane.

15. The system of claim 14 wherein:
    the user interface is adapted to display the current draw of the power module.

16. The system of claim 12 wherein:
    an ambient light sensor is also electrically connected with the backplane; and
    the user interface is adapted to display data from the ambient light sensor and to accept as an input new backlight emission levels to be provided via the change controlling software to the LCD if the ambient light level as measured by the ambient light sensor is determined to fall outside of corresponding acceptable operating parameters saved on the electronic storage medium.

17. A computing device for remotely monitoring and controlling an electronic display having a display assembly, a backplane electrically connected with the display assembly, an ambient light sensor electrically connected with the backplane, a power module electrically connected with the backplane, and a fan electrically connected with the backplane, the device comprising:
- an electronic storage medium at a location remote to the electronic display and electrically connected with a processor, a second display, and a network communication port;
- wherein the electronic storage medium contains operating instructions to accept and display the speed of the fan, the current draw and temperature of the power module, and the data from the ambient light sensor; and
- wherein the electronic storage medium further contains operating instructions which provide an acceptable range for the current draw and temperature of the power module and analyze the incoming current draw and temperature data to determine if it has fallen outside the acceptable range.

* * * * *